(12) United States Patent
Boussemart

(10) Patent No.: US 11,988,530 B2
(45) Date of Patent: May 21, 2024

(54) METHOD FOR DETECTING AN ABSOLUTE ANGULAR POSITION OR AN ABSOLUTE ANGULAR MOVEMENT PATH OF A ROTATING MEMBER

(71) Applicant: Robert Bosch GmbH, Stuttgart (DE)

(72) Inventor: Franck Boussemart, Saint Anne (FR)

(73) Assignees: Robert Bosch Automotive Steering Vendome, Vendome (FR); Robert Bosch GmbH, Stuttgart (DE)

( * ) Notice: Subject to any disclaimer, the term of this patent is extended or adjusted under 35 U.S.C. 154(b) by 235 days.

(21) Appl. No.: 17/754,398

(22) PCT Filed: Oct. 7, 2020

(86) PCT No.: PCT/EP2020/078148
§ 371 (c)(1),
(2) Date: Mar. 31, 2022

(87) PCT Pub. No.: WO2021/069510
PCT Pub. Date: Apr. 15, 2021

(65) Prior Publication Data
US 2022/0341759 A1    Oct. 27, 2022

(30) Foreign Application Priority Data
Oct. 8, 2019 (FR) ..................... 1911165

(51) Int. Cl.
*G01D 5/244* (2006.01)
*G01D 5/14* (2006.01)
(Continued)

(52) U.S. Cl.
CPC ......... *G01D 5/24476* (2013.01); *G01D 5/142* (2013.01); *G01D 5/24466* (2013.01); *G01D 5/2457* (2013.01); *G01P 3/487* (2013.01)

(58) Field of Classification Search
CPC .............. G01D 5/142; G01D 5/24466; G01D 5/24476; G01D 5/2457; G01P 3/487
See application file for complete search history.

(56) References Cited

U.S. PATENT DOCUMENTS

2002/0057084 A1* 5/2002 Preymann ............ G01D 5/2457
324/207.2
2013/0187581 A1* 7/2013 Wagener ............. H03M 1/1038
318/400.06
(Continued)

FOREIGN PATENT DOCUMENTS

CN         1136842 A    11/1996
CN         1826510 A    8/2006
(Continued)

OTHER PUBLICATIONS

DE 19835091 and translation (Year: 1999).*
(Continued)

*Primary Examiner* — Steven L Yeninas
(74) *Attorney, Agent, or Firm* — Maginot, Moore & Beck LLP

(57) ABSTRACT

A multi-pole annular encoder having 2N poles distributed irregularly is positioned facing a sensor that detects transitions between the poles. Times corresponding to the detected transitions are stored and the times that have elapsed between each transition and the previous transition of order 2N, which constitute durations for a complete revolution of a rotating member, are calculated. When the durations thus calculated are stable, a time that has elapsed between a tested transition and the previous transition is calculated, and a characteristic angle of the tested transition is deduced therefrom, this being proportional to a ratio between a time that has elapsed since the previous transition and a stabilized duration for a complete revolution. An index transition is (Continued)

identified and is used to ascertain absolute position of the encoder with respect to the sensor.

15 Claims, 2 Drawing Sheets

(51) Int. Cl.
    *G01D 5/245*     (2006.01)
    *G01P 3/487*     (2006.01)

(56) References Cited

U.S. PATENT DOCUMENTS

| | | | | |
|---|---|---|---|---|
| 2014/0375312 | A1* | 12/2014 | Friedrich | G01P 3/4802 |
| | | | | 324/259 |
| 2020/0136476 | A1* | 4/2020 | Gassend | H02K 11/30 |
| 2022/0200409 | A1* | 6/2022 | McMahon | G01D 5/24495 |

FOREIGN PATENT DOCUMENTS

| | | |
|---|---|---|
| CN | 102538838 A | 7/2012 |
| CN | 102686982 A | 9/2012 |
| CN | 103256883 A | 8/2013 |
| CN | 105492869 A | 4/2016 |
| CN | 106489064 A | 3/2017 |
| CN | 107850463 A | 3/2018 |
| CN | 108885123 A | 11/2018 |
| CN | 109983309 A | 7/2019 |
| DE | 198 35 091 C1 | 6/1999 |
| DE | 100 17 542 A1 | 10/2001 |
| EP | 1 404 016 A1 | 3/2004 |
| EP | 2 597 429 A1 | 5/2013 |
| GB | 2 065 310 A | 6/1981 |
| WO | 01/77693 A1 | 10/2001 |
| WO | 03/054556 T3 | 7/2003 |

OTHER PUBLICATIONS

International Search Report corresponding to International Patent Application No. PCT/EP2020/078148, dated Dec. 7, 2020 (5 pages).
Hao et al., "Design of Absolute Multi-Pole Shaft Encoders", Optics and Precision Engineering, Apr. 2010, vol. 18, No. 4, pp. 863-871.
He et al., "Design and Implementation of Calculating Absolute Rotation Angle Through Rotary Electronic Encoder", Journal of Chongqing Technology and Business University (Natural Sciences Edition), Oct. 2009, vol. 26, No. 5, China, pp. 472-476.
Cong et al., "Design of Rotation Angle Measuring Device Based on STM32F103", Tool Technology, Jul. 2016, vol. 51, No. 1, pp. 108-110.
Rapos et al., "Dynamic Sensor Calibration: A Comparative Study of a Hall Effect Sensor and an Incremental Encoder for Measuring Shaft Rotational Position", Conference on Prognostics and Health Management (ICPHM), 2016 IEEE, 2016, Sudbury, Canada, 5 pages.
Chinese Search Report corresponding to Chinese Patent Application No. 202080070392.2, mailed Jun. 19, 2023 (4 pages).

* cited by examiner

METHOD FOR DETECTING AN ABSOLUTE ANGULAR POSITION OR AN ABSOLUTE ANGULAR MOVEMENT PATH OF A ROTATING MEMBER

This application is a 35 U.S.C. § 371 National Stage Application of PCT/EP2020/078148, filed on Oct. 7, 2020, which claims the benefit of priority to Serial No. FR 1911165, filed on Oct. 8, 2019 in France, the disclosures of which are incorporated herein by reference in their entirety.

The disclosure relates to a measuring device comprising a multipole annular encoder comprising N pairs of poles that is fastened to a member that rotates with respect to a reference member and a sensor fastened to the reference member, each pair of poles comprising a pole of north type and a pole of south type, the N pairs of poles forming, over one revolution, an alternation of poles of north type and of poles of south type, the alternation of poles of north type and of poles of south type not being angularly equidistributed. It also relates to use of such a device to detect absolute angular travels of the rotating member with respect to the reference member.

BACKGROUND

To determine the angular position, travel or speed of a member rotating with respect to a reference member about an axis of rotation, it is known to equip the rotating member with an annular encoder and to equip the reference member with a sensor that is placed facing the encoder, so as to read information conveyed by the encoder during the rotation of the rotating member.

Commonly, the encoder comprises at least a first read track that will be said to be multipole below and that consists of an alternation of poles of north type and of poles of south type that are equidistributed around the periphery of the encoder. It may be a question of a magnetic encoder, but also of an optical encoder, the poles of north type and of south type then being distinguished between through their different optical properties (color, reflectivity), or of what is commonly called a phonic wheel, namely a toothed wheel the alternations of teeth and of troughs of which are detectable by a Hall-effect sensor. In every configuration, the sensor detects the transitions between the successive north and south poles during the rotations of the rotating member, and a counter allows an angle of relative rotation between the rotating member and the reference member to be deduced therefrom, provided that the direction of rotation is known. Associated with a clock, such a counter also allows speeds of rotation to be measured. The precision of these measurements increases with the number of poles and with the resolution of the clock.

After calibration has been carried out and an origin determined for the angle count, the datum of the direction of rotation and the count of the transitions allow an absolute angular position or an absolute angular travel of the rotating member with respect to the reference member to be computed, with an angular resolution corresponding to the pitch between two successive poles of the encoder.

In practice, this type of measuring device is especially used to instrument mechanical assemblies comprising a motor for driving the rotating member with respect to the fixed member, and a motor control unit that delivers commands to start-up and stop the motor, the start-up commands comprising, where appropriate, information on direction of rotation that may be extracted and taken advantage of in the count of the transitions which, depending on the direction of rotation, increment or decrement the counter.

To limit power consumption, such a measuring device is conventionally powered down when the rotating member is stopped. The power-up of the measuring device is then triggered by the motor control unit.

Consequently, there are periods during which the measuring device is blind, in the sense that it is unable to detect any variations in the angular position of the rotating member when the motor is stopped. Such variations may especially be induced by relaxation of internal stresses or by micromovement of the stopped rotating member.

The sensor may thus, when it is woken up, not be located facing the same pole of the encoder as when it went to sleep. This situation may potentially be detected, for example if the pole on wake-up is of different polarity from the pole on going to sleep and if the sensor is able to read not only the transitions between poles but also the nature of the poles. However, even in such circumstances, it is not possible to determine either the direction or the amplitude of the movement of the rotating member during the period for which the sensor was asleep.

Naturally, it is possible to add a second annular encoder, the latter containing a singularity that is read by a second sensor, with a view to resetting on each revolution the information conveyed by the multipole encoder. However such a system is more complex and potentially consumes more power.

To mitigate measurement inexactnesses and inaccuracies related to encoder manufacturing tolerances, it has been proposed in document DE 198 35 091 C1 to correct the calculations of angles of rotation deduced from transition detections depending on characteristic values determined beforehand during an encoder calibration procedure.

In document DE 100 17 542 A1, a device for determining the position of a rotating member has been proposed that employs a specific multipole encoder the distribution of the poles of which is irregular. More precisely, the multipole encoder consists of a plurality of pairs of poles, each pair of poles having a length equal to the other pairs of poles, but one at least of the pairs of poles having poles of different lengths. By measuring the times between successive transitions of the encoder as it passes in front of a sensor, and with prior knowledge of the lengths of the poles, it is possible to determine direction, angular speed and absolute angular position.

SUMMARY

The disclosure aims to remedy the drawbacks of the prior art and to provide simple means, which consume little power or computing time, for detecting and/or correcting errors in the determination of an absolute angular position or of an absolute angular travel of a rotating member with respect to a reference member.

To do so, there is provided, according to a first aspect of the disclosure, a method for detecting an absolute angular position or an absolute angular travel of a rotating member with respect to a reference member about an axis of rotation, using a measuring device comprising a multipole annular encoder comprising N pairs of poles that is fastened to the rotating member and a sensor that is fixed with respect to the reference member, each pair of poles comprising a pole of north type and a pole of south type, the N pairs of poles forming, over one revolution, an alternation of poles of north type and of south type, the alternation of poles not being distributed regularly around the axis of rotation, the method comprising a detection, by the sensor, of a sequence of successive transitions each characteristic of a passage of the poles of the alternation of poles in front of the sensor, the method being characterized in that it comprises the following operations:

determining a plurality of moving complete rotation times each associated with one transition extracted from the sequence of successive transitions and each equal to the time separating the extracted transition from a preceding transition of order 2N of the sequence of successive transitions, and an estimated complete rotation time, which is dependent on one or more of the moving complete rotation times, for a plurality of transitions of the sequence of successive transitions, each of which is referred to as a tested transition, and preferably for all the transitions of the sequence of successive transitions, determining at least one characteristic time of the tested transition, equal to the time separating the tested transition from another transition of the sequence of successive transitions, the other transition being immediately adjacent to be tested transition in the sequence of successive transitions or being separated from the tested transition by a predetermined number Q of successive transitions of the sequence of successive transitions, Q being comprised between 1 and 2N−2, computing for each tested transition a characteristic angle of the tested transition, which angle is proportional to a ratio between the characteristic time of the tested transition and the estimated complete rotation time.

The method may take advantage of an observed imperfection in a multipolar encoder designed to have a symmetry of revolution of order 2N, but the alternation of poles of north type and of poles of south type of which turns out to be imperfectly equidistributed, or employ an encoder intentionally designed to have at least one transition between two successive poles, the position of which is specific.

The indexing transition will possibly for example be the transition the angular distance of which to one of its directly neighboring transitions is the smallest, or the largest. In this case, the characteristic time of the tested transition will possibly be the time separating it from the transition directly preceding it or directly following it (i.e. without intermediate transition, Q=0) in the sequence of detected transitions.

The indexing transition will possibly, where appropriate, be characterized by a more complex angular signature, with respect to one or more other transitions: the indexing transition will for example possibly be characterized by two characteristic angles separating it from two other transitions that are located on either side of the indexing transition and that are directly adjacent (Q=0) or not (Q>0).

The complete rotation time makes it possible to estimate a quantity proportional to the inverse of the average speed of rotation per revolution, which is insensitive to the irregularity in the angular distribution of the poles. By dividing the characteristic time of the tested transition by the time of one complete rotation, an angular measurement that is independent of the speed of rotation of the rotating member is determined. It is possible to envision various ways of determining the estimated complete rotation time:

According to one embodiment, the estimated complete rotation time is equal either to the moving complete rotation time associated with the tested transition, with the other transition or with any transition between the tested transition and the other transition, According to another embodiment, the estimated complete rotation time is equal to an average computed from at least certain of the moving complete rotation times, and preferably an average computed from a plurality of times among the following times: the moving complete rotation time associated with the tested transition, the moving complete rotation time associated with the other transition, and where appropriate one or more moving complete rotation times associated with one or more transitions separating the tested transition from the other transition.

According to one embodiment, the characteristic angle of the tested transition is compared with a specific indexing angle stored beforehand in memory or with a plurality of other angles characteristic of one or more other tested transitions, with a view to determining whether the tested transition corresponds to a unique predetermined indexing transition that is characteristic of the irregular distribution of the alternation of poles around the axis of rotation.

In so far as the signature of the indexing transition is unique, it will be possible to determine whether the tested transition corresponds to the indexing transition by comparing the characteristic angle of the tested transition to the characteristic angles of all the other transitions.

Alternatively, and in so far as the computed ratio between the characteristic time of the tested transition and the moving complete rotation time associated with the tested transition delivers a result that is an angle characteristic of the tested transition, it will be possible to determine whether the tested transition corresponds to the indexing transition by comparing the characteristic angle of the tested transition to a predetermined value, which is kept in memory and is characteristic of the specific indexing angle.

According to one embodiment, provision is made for the following operations:

on detection by the sensor of successive transitions characteristic of the passages of the poles of the alternation of poles in front of the sensor, incrementing or decrementing at least one transition counter depending on the detected transitions and, where appropriate, on a given direction of rotation of the rotating member; and when the tested transition corresponds to the indexing transition, reading a current value of the transition counter, and writing to the transition counter a replacement value dependent on the current value and on a specific indexing number of the indexing transition.

The transition counter delivers, at any given time, information on the angular travel of the rotating member, and information on the absolute angular position of the rotating member. This information may potentially not be free from error, especially if the rotating member changed position while the sensor was on standby. Recognition of the indexed transition allows the value of the counter to be corrected. The replacement value is dependent both on the current value of the counter, which delivers information on the number of revolutions of the angular travel, and on the specific indexing number of the indexing transition, which specifies the exact angular position of the rotating member.

In practice, the rotating member is driven by a motor or a geared motor, and especially an electric motor. When the rotating member is driven bidirectionally, the direction of rotation of the rotating member may be determined by determining the direction of the command controlling the motor, and for example the polarity of a supply current of the motor. According to one embodiment, a command to rotate the rotating member in a given direction of rotation is detected and the given direction of rotation is stored in memory.

In practice, the expected errors are especially errors of very small amplitude, that occur consecutively to the relaxation of internal stresses in the rotating member when the driving motor stops and the sensor is placed on standby. It has been observed that the amplitude of such errors may lead to a shift of one pole between the last pole seen by the sensor before the placement on standby and the first pole seen by the sensor when it wakes up. For this reason, provision may be made, when the sensor is able to detect the type of a pole of the alternation of poles that is located facing the sensor, for the following operations:

- on stoppage of the rotating member, storing in memory the last type of pole detected and the current value of the transition counter;
- on restart of rotation of the rotating member, reading the first type of pole detected and restarting the incrementation or the decrementation of the transition counter from the current value stored in memory;
- if the first type of pole detected is not identical to the last type of pole detected, raising a vigilance flag;
- lowering the vigilance flag when the replacement value is written.

The ratio between the characteristic time of the tested transition and the estimated complete rotation time will be an estimation, of the characteristic angle of the tested transition, the correctness of which will increase as fluctuations in the speed of rotation on the scale of one revolution decrease. Preferably, provision is made for a procedure for testing an angular speed stability condition regarding the stability of the angular speed of the rotating member with respect to the reference member about the axis of rotation, comprising, for at least the tested transition and the other transition:

- computing the difference between the moving complete rotation times associated with the tested transition and with the other transition;
- at least one comparison of said difference to a threshold dependent on the estimated complete rotation time, with a view to determining whether the speed stability condition is met or not.

According to one embodiment, provision is made for at least the operation of computing a characteristic angle of the tested transition to be carried out or exploited only if the angular speed stability condition is met. In practice, the procedure for testing an angular speed stability condition is carried out for each of the tested transitions.

To determine rotation times and characteristic times for the various tested transitions, two clocks per tested transition may be employed, each triggered then read and reset to zero on the detection of successive transitions by the sensor.

Alternatively, and according to one preferred embodiment, the sensor is connected to at least one clock and one random-access memory comprising at least 2N memory locations, the method comprising, for each of the transitions of the succession of successive transitions detected by the sensor, storage, in one of the locations of the random-access memory, of a corresponding time of the clock, each of the determined times being computed by computing a time difference between two of the stored times. The method then requires only one clock.

According to one embodiment, on the basis of at least two characteristic angles of two tested transitions or of the same tested transition, a direction of relative rotation between the rotating member and the reference member is determined.

According to one embodiment, the method comprises, for each tested transition, determining at least one second characteristic time of the tested transition, equal to the time separating the tested transition from a second other transition of the sequence of successive transitions, the second other transition being immediately adjacent to the tested transition in the sequence of successive transitions or separated from the tested transition by a predetermined number Q of successive transitions of the sequence of successive transitions, Q being comprised between 1 and 2N−2, and being different from the other tested transition.

According to another aspect of the disclosure, the latter relates to a measuring device for instrumenting an assembly comprising a rotating member that is able to rotate with respect to a reference member about an axis of rotation, the measuring device comprising:

- a multipole annular encoder comprising N pairs of poles that is intended to be fastened to the rotating member, each pair of poles comprising a pole of north type and a pole of south type, the N pairs of poles forming, on one rotation, an alternation of poles of north type and of poles of south type, the alternation of poles of north type and of poles of south type not being distributed regularly around the axis of rotation;
- a sensor, for example an optical or preferably magnetic sensor, intended to be fixed with respect to the reference member so as to detect a succession of successive transitions each characteristic of a passage of the poles of the alternation of poles in front of the sensor; and
- a measuring circuit programmed to execute the method such as described above.

Preferably, the sensor is able to detect the north or south type of a pole of the alternation of poles that is located facing the sensor. It may especially be a Hall-effect sensor allowing the north and south magnetic poles of a multipole magnetic encoder to be distinguished between.

The device preferably comprises a clock and a memory comprising at least 2N locations for storing clock times, each memory location being associated with one of the 2N successive transitions between two successive poles of the encoder.

The measuring device is preferably connected to a motor for driving the rotating member or to a control unit of such a driving motor so as to read a signal representative of a direction of rotation of the motor, and to store the corresponding information in memory.

BRIEF DESCRIPTION OF THE DRAWINGS

Other features and advantages of the disclosure will become apparent on reading the following description, with reference to the appended figures, which illustrate.

For the sake of clarity, identical or similar elements have been designated with identical reference signs in all the figures.

DETAILED DESCRIPTION

Figure 1:
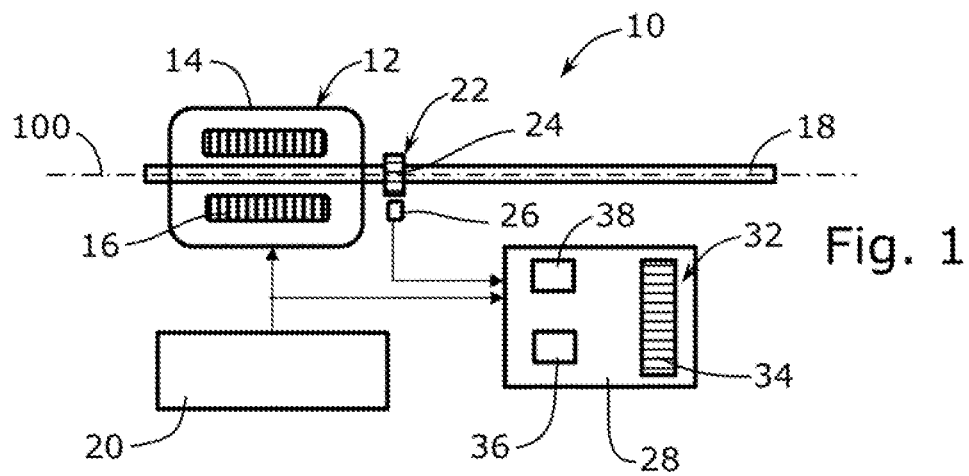
FIG. 1, a rotating system comprising a device according to one embodiment of the disclosure.

FIG. 1 schematically illustrates a rotating system 10 comprising an electric motor 12, in the casing 14 of which are housed stator windings 16 that allow a motor shaft 18 to be driven about a reference axis 100 that is fixed with respect to the motor casing 14. The motor 12 may be of any type. It is controlled by a control circuit 20 that delivers stop/start commands, the start commands comprising where appropriate information on direction of rotation if the motor 12 is bidirectional.

In the rest of the description, the motor shaft 18 will be referred to as the "rotating member", and the fixed portion 14 of the motor will be referred to as the "reference member". The rotating system is instrumented with a device 22 for measuring an absolute angular position or an absolute angular travel of the rotating member 18 with respect to the reference member 14 about the axis of rotation 100, which comprises a multipole annular encoder 24 that is fastened to the rotating member 18 and placed facing a sensor 26 that is fixed with respect to the reference member 14. The encoder 24 is here of magnetic type and the sensor 26 is an inductive sensor, for example a Hall-effect sensor, but the disclosure is applicable to other types of multipole encoders and to other types of sensors, for example encoders and sensors operating on an optical principle.

Figure 2:
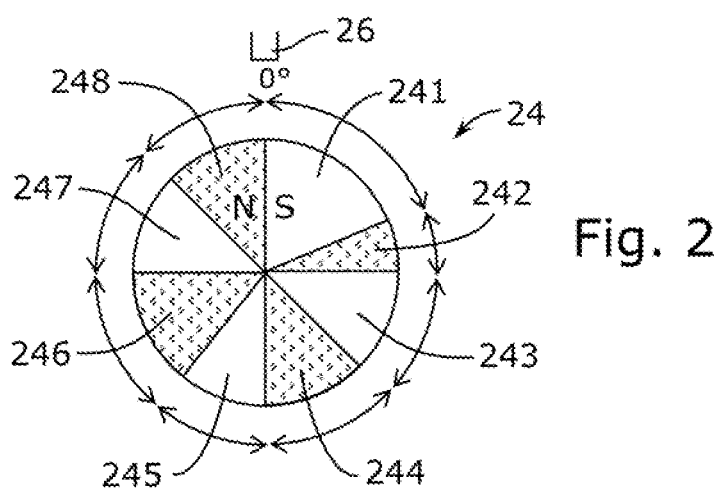
FIG. 2, a schematic view of an encoder of the device of FIG. 1.

By multipole encoder, what is meant here is an encoder comprising N pairs of poles, N being a nonzero integer number, each pair of poles comprising a pole of north type (for example a magnetic north pole or an angular sector having a first optical property) and a pole of south type (for example a magnetic south pole or an angular sector having a second optical property distinct from the first optical property). The N pairs of poles form, on the circumference of the ring, an alternation of poles of north type and of poles of type, as illustrated in FIG. 2 for N=4.

The sensor 26 is positioned on the reference member 14 so as to detect the transitions between poles of north type and poles of south type. Preferably, the sensor 26 is also able to detect the north or south type of the pole that it is facing.

The instrumentation of the system further comprises a measuring circuit 28. The measuring circuit 28 is connected to the sensor 26 with a view to reading the detected transitions, and where appropriate the north or south type of each pole of the encoder 24 seen by the sensor 26. The measuring circuit 28 is also connected to the control circuit 26 of the motor 12 with a view to reading information representative of the commands to start and stop the motor 12, and where appropriate commands regarding the direction of rotation of the motor 12. The measuring circuit 28 may also be connected to the control circuit 20 with a view to delivering to the control circuit 20 information computed by the measuring circuit 28.

The measuring circuit 28 may comprise a sleep-inducing circuit, which is able to decrease the consumption of the measuring circuit 28 and especially to halt the supply of power to the sensor, after detection of a command to stop the motor 12 or after detection of stoppage of the rotating member 18, and until a command to start the motor 12 is detected.

The measuring circuit 28 comprises a clock 30, a memory 32 comprising at least 2N locations 34 for storing times of the clock 30 and a transition counter 36 that it is possible to increment, decrement or reset to zero. The measuring circuit 28 also comprises a processor 38 for performing logic and algebraic operations on the clock times and for reading from and writing to the memory 32 and the transition counter 36.

On each detection by the sensor 26 of a transition between two poles of the encoder, and depending on the direction of rotation determined by the control circuit 20 of the motor, the measuring circuit 28 is programmed on the one hand to increment or decrement the transition counter 36, which takes a current value j, where j is any relative integer, and on the other hand to store the current clock time $T_j$ in the memory 32 in 2N locations 34 circularly. Thus, for a succession of at least 2N detected successive transitions, a corresponding sequence of at least 2N stored successive times $T_j$ is generated.

Figure 3:
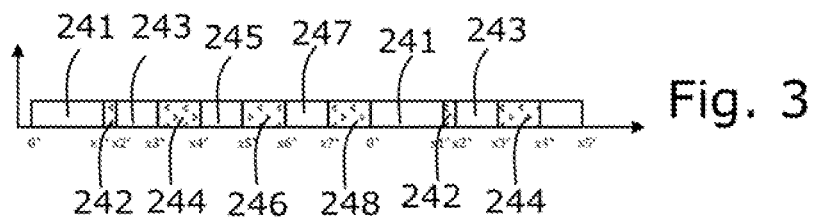
FIG. 3, a graph showing, laid out flat, the angular distribution of the encoder of FIG. 2.
Figure 4:
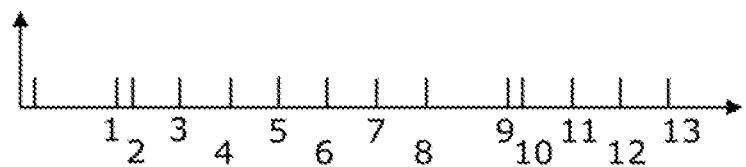
FIG. 4, a graph illustrating an angular distribution of successive transitions between poles of the encoder of FIG. 2, and the corresponding incrementation of a transition counter.

Noteworthily, the alternation of poles of north type and of poles of south type of the encoder is not distributed regularly around the axis of rotation. By way of illustration, FIG. 2 schematically shows an encoder 24 having eight poles 241 to 248 and FIG. 3 shows, on a linear angular scale, laid out flat, the poles 241 to 248 of the encoder 24 of FIG. 2 over more than one revolution, and FIG. 4 shows the corresponding successive incrementations of the transition counter 36 (here arbitrarily numbered from 1 to 13) in response to the transitions detected by the sensor 26. As may be seen there is, between transitions 1 and 2, then 9 and 10, a narrow pole 242 succeeding, between transitions 8 and 9, a wide pole and preceding, between transitions 2 and 3, a pole of average width. This irregularity may be a random consequence of a manufacturing process of the encoder 24 in which the width of the poles 241 to 248 is not perfectly controlled. It may also be, preferably, induced by intentionally manufacturing the encoder 24 with different pole widths.

One consequence of this irregularity is that the angular sector covering an integer number P of poles varies depending on the pole observed first, when P is not a multiple of 2N, and especially when P is strictly lower than 2N. Consequently, counting P successive transitions observed by the sensor does not alone allow the corresponding angular travel or average speed to be computed for these P transitions, unless P is a multiple of 2N. Conversely, when P is a multiple of 2N, it is known that the rotating member has made an integer number of revolutions, and that the computable average speed will be free from error.

According to the disclosure, provision is made to take advantage of this fact by observing, for each transition detected by the sensor, the time interval $D_j=T_j-T_{j-2N}$ separating this transition from the preceding detected transition of order 2N. Thus, for each detected transition of order j, a time $D_j$ taken by the rotating member to make the complete rotation ending with this transition is computed. The inverse $1/D_j$ of this time represents an average speed of the complete rotation, expressed in number of revolutions per unit of time.

If it is assumed that the speed of rotation of the rotating member 18 varies little between two given observation times $T_i$ and $T_j$ corresponding to two values i and j of the transition counter 36 that are sufficiently close together in the series of successive transitions detected, the time passed between the two times, divided by an estimated time D that the rotating member will take to make one complete rotation, may be considered to be a measurement of an angular sector $\delta_{ji}$ of the encoder 24 between the two transitions, which is a characteristic angle of the transition j.

$$\delta_{ji} \approx \frac{T_j - T_i}{D}$$

In practice, it is possible to choose, by way of estimated rotation time D, the complete rotation time $D_j$ associated with the observation of rank j, or the complete rotation time $D_i$ associated with the observation of rank i, or an average value computed over the interval between the observations i and j, for example:

$$D = \frac{D_j - D_i}{2} \text{ or}$$

$$D = \frac{\sum_{k=1}^{k=j} D_k}{j-i+1} = \frac{\sum_{k=1}^{k=j}(T_k - T_{k-2N})}{j-i+1}$$

In practice, i will be chosen to be close to j:

$1 \leq j-i \leq 2N-1$ and preferably:

$1 \leq j-i \leq N-1$ and particularly preferably:

$j=i+1$

To validate the assumption of stability of the speed of rotation of the rotating member, a test may be carried out on the rotation times $D_j$ and $D_i$ or on all the times $D_k$ of index k varying from i to j, with a view to determining whether the observed variations are small with respect to D. It is for example possible to validate whether a condition expressed in the following way is met:

$$\frac{\sum_{k=i+1}^{k=j}(D_k - D_{k-1})}{D \cdot (j-i)} < \varepsilon$$

where $\varepsilon$ is a low predetermined threshold, for example lower than $10^{-2}$.

When the condition is met, the value $\delta_{ji}$ is considered to indeed correspond to the value of the angle between the transitions i and j.

If this computation is repeated for 2N values of successive j's, an estimation of the characteristic angles $\delta_{ji}$ of all the transitions over one revolution is obtained and it is possible to identify the j value having a particular signature (for example the lowest value corresponding in the example of FIG. 2 to the pole 242 occupying the smallest angular sector, or the highest value corresponding to the pole 241 occupying the largest angular sector).

This signature corresponds to a known position of a pole or of an indexing transition of the encoder. It is then possible to check whether the corresponding value of the encoder, modulo 2N (i.e. the remainder of integer division of the value contained in the counter by 2N), corresponds or not to this pole or indexed transition. In the event of a shift, it is possible to replace the value contained in the counter with a corrected value that is dependent on the number of revolutions detected by the counter (the quotient of the division of the current value of the counter by 2N) and on a predetermined value attributed to the singularity.

Alternatively, in a prior calibrating step, a specific angle $\Delta$ of the indexing alternation or pole (for example the angle between the two transitions bounding the pole 242) may have been stored in memory and then, during operation of the installation, each characteristic angle $\delta_{ji}$ may be compared to this specific angle.

To increase the level of confidence in the recognition of the indexing transition or pole, it is possible to compute more than one characteristic angle of the transition. It is for example possible to uniquely identify the transition corresponding to increment 9 in FIG. 4, between the poles 241 and 242, by two angles that separate it from the two transitions that flank it, namely the angle $\Delta_{241}$ that separates it from transition 8 and the angle $\Delta_{242}$ that separates it from transition 10, knowing that $\Delta_{241}$ is the smallest angular sector between two successive transitions and $\Delta_{242}$ the largest angular sector. When the computation of the characteristic angles $\delta_{ji}$ delivers two successive values $\delta_{i,j-1}$ and $\delta_{j+1,j}$ that correspond to $\Delta_{241}$ and $\Delta_{242}$, respectively, or that are the smallest value and the largest value of the characteristic angles computed over one revolution, respectively, the increment j is determined to correspond to the transition between the poles 241 and 242.

It will be noted that computing a plurality of characteristic angles of a given transition allows not only the indexing transition to be recognized with a higher level of confidence, but also the direction of rotation of the rotating member to be determined.

In the above description it was assumed that the clock provided a precise time with respect to the observed events. In practice, the clock must have a temporal resolving power f, expressed in Hz, substantially higher than the frequency of passage of the transitions in front of the sensor. If $V_{Max}$ is the maximum speed of rotation delivered by the motor 12, expressed in rad/s:

$$f \gg \frac{2N}{2\pi} \cdot V_{Max}$$

In practice:

$$f > 10^2 \frac{2N}{2\pi} \cdot V_{Max}$$

Figure 5:
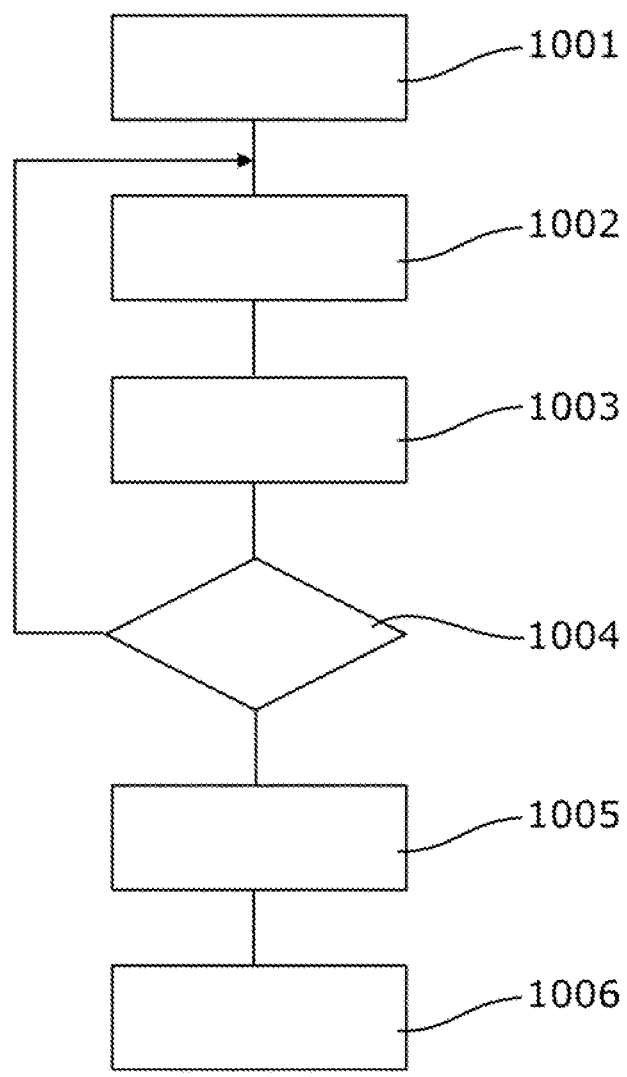
FIG. 5, a flowchart of a program implementing a method according to the disclosure.

FIG. 5 illustrates a flowchart of a program implementing the method according to the disclosure, in a case where j=i+1, i.e. in the case where the computed characteristic angles are the angles between two successive transitions of the encoder 24.

An initial state 1000 in which the motor is stopped is assumed, the transition counter 36 preserving the last known value of a preceding execution of the program but not necessarily representing with exactness the actual position of the rotating member, which may have moved very slightly since the last observation. Optionally, the measuring circuit 28 may also have stored in memory the north or south type of the last pole detected before stoppage.

In step 1001, a command to control the motor in a given direction is transmitted by the control circuit 20 and detected by the measuring circuit 28, which stores in memory the direction of rotation and wakes up the sensor 26. Optionally, provision may be made for the sensor to read the north or south type of the pole that it detects on waking up, and for this type to be compared to the type of the pole detected last before stoppage, in order to raise a vigilance flag if the two types differ and to lower it otherwise. A raised vigilance flag means that it is not known whether there has been a shift or not. This test may especially be useful if it is known that the changes in position of the rotating member when the motor is stopped can only be very small and smaller than the angular width of the smallest pole of the encoder. Specifically, in this case, the position of the vigilance flag makes it possible to know whether or not a shift has occurred, and to decide accordingly whether the following steps of the program must be executed or not.

In step 1002, the sensor 26 detects the transitions between successive poles of the encoder 24, and the measuring circuit 28 supplies the memory 34 with the corresponding clock times $T_j$ and increments or decrements the transition counter, depending on the direction of rotation stored beforehand in memory in step 1001. As a variant, provision may be made for the direction of rotation not to be transmitted by the control circuit 20 to the measuring circuit 28, and for two separate counters to be used in parallel, one incremented on each detected transition and corresponding to the case of a first direction of rotation and the other, decremented on each detected transition, corresponding to the case of the opposite direction of rotation.

In step 1003, after detection of at least 2N successive transitions, the processor 38 computes, on each transition k, the time $D_k$ past since the preceding transition of order 2N.

In step 1004, the processor 38 tests the stability of the speed of rotation of the rotating member by determining whether the following inequality is respected:

$$\frac{\sum_{k=j-N+1}^{k=j}(D_k - D_{k-1})}{N \cdot D_j} < \varepsilon$$

If the test is positive, in step 1005 characteristic angles $\delta_{k,k-1}$ are computed for the transitions k between j–N and j and the transition L corresponding to the indexing transition is identified.

In step 1006, the transition counter 36 is corrected by writing to the counter a value that is equal to the sum of the quotient of the current value divided by 2N and of the value, comprised between 1 and 2N, associated with the indexing transition. Where appropriate, the vigilance flag may be lowered. From this step, the transition counter 36 is considered to give error-free information on the angular travel of the encoder 24 and of the rotating member 18 with respect to a calibration position.

Naturally, the examples shown in the figures and discussed above are completely nonlimiting and given merely by way of illustration. The various embodiments illustrated are explicitly combinable with one another to produce therefrom other embodiments.

The invention claimed is:

1. A method for detecting an absolute angular position or an absolute angular travel of a rotating member with respect to a reference member about an axis of rotation, using a measuring device comprising a multipole annular encoder comprising N pairs of poles that is fastened to the rotating member and a sensor that is fixed with respect to the reference member, each pair of the poles comprising a pole of north type and a pole of south type, the N pairs of poles forming, over one revolution, an alternation of poles of north type and of south type, the alternation of poles not being distributed regularly around the axis of rotation, the method comprising:
   detecting with the sensor a sequence of successive transitions, each transition characteristic of a passage of the poles of the alternation of poles in front of the sensor;
   for a plurality of the transitions, each of which is referred to as a tested transition, and preferably for all the transitions of the sequence of successive transitions, determining at least one characteristic time of the tested transition, equal to a time separating the tested transition from another transition of the sequence of successive transitions, the other transition being immediately adjacent to the tested transition in the sequence of successive transitions or being separated from the tested transition by a predetermined number of successive transitions of the sequence of successive transitions, the predetermined number comprised between 1 and 2N−2;
   determining a plurality of moving complete rotation times each associated with one of the transitions extracted from the sequence of successive transitions and each equal to a time separating the extracted transition from a preceding transition of order 2N of the sequence of successive transitions, and an estimated complete rotation time, which is dependent on one or more of the moving complete rotation times; and
   computing for each tested transition at least one characteristic angle of the tested transition, which angle is proportional to a ratio between the characteristic time of the tested transition and the estimated complete rotation time.

2. The method as claimed in claim 1, wherein the estimated complete rotation time is equal either to the moving complete rotation time associated with the tested transition, with the other transition or with any transition between the tested transition and the other transition, or to an average computed from at least certain of the moving complete rotation times.

3. The method as claimed in claim 1, further comprising:
   comparing the characteristic angle of the tested transition with a specific indexing angle stored beforehand in a memory or with a plurality of other angles characteristic of one or more other tested transitions, with a view to determining whether the tested transition corresponds to a unique predetermined indexing transition that is characteristic of an irregular distribution of the alternation of poles around the axis of rotation.

4. The method as claimed in claim 3, further comprising:
   on detection by the sensor of the successive transitions characteristic of the passages of the poles of the alternation of poles in front of the sensor, incrementing or decrementing at least one transition counter depending on the detected transitions and, where appropriate, on a given direction of rotation of the rotating member; and
   when the tested transition corresponds to the indexing transition, reading a current value of the at least one transition counter, and writing to the at least one transition counter a replacement value dependent on the current value and on a specific indexing number of the indexing transition.

5. The method as claimed in claim 4, further comprising:
   detecting a command to rotate the rotating member in a given direction of rotation; and
   storing the given direction of rotation in the memory.

6. The method as claimed in claim 4, wherein the sensor is configured to detect a type of the pole of the alternation of poles that is located facing the sensor, the method further comprising:
   on stoppage of the rotating member, storing in the memory a last type of the pole detected and the current value of the transition counter;
   on restart of rotation of the rotating member, reading a first type of the pole detected and restarting the incrementation or the decrementation of the transition counter from the current value stored in the memory;
   if the first type of the pole detected is not identical to the last type of the pole detected, raising a vigilance flag; and
   lowering the vigilance flag when the replacement value is written.

7. The method as claimed in claim 1, further comprising:
a procedure for testing an angular speed stability condition regarding a stability of the angular speed of the rotating member with respect to the reference member about the axis of rotation, comprising, for at least the tested transition and the other transition:
   computing a difference between the moving complete rotation times associated with the tested transition and with the other transition; and
   at least one comparison of said difference to a threshold dependent on the estimated complete rotation time, with a view to determining whether the angular speed stability condition is met or not.

8. The method as claimed in claim 7, wherein at least the operation of computing the at least one characteristic angle of the tested transition is carried out or exploited only when the angular speed stability condition is met.

9. The method as claimed in claim 7, wherein the procedure for testing an angular speed stability condition is carried out for each of the tested transitions.

10. The method as claimed in claim 1, wherein the sensor is connected to at least one clock and one non-transitory random-access memory comprising at least 2N memory locations, the method further comprising:
   for each of the transitions of the succession of successive transitions detected by the sensor, storing, in one of the locations of the random-access memory, a corresponding time of the clock, each of the determined times computed by computing a time difference between two of the stored times.

11. The method as claimed in claim 1, further comprising:
on the basis of at least two characteristic angles of two tested transitions or of the same tested transition, determining a direction of relative rotation between the rotating member and the reference member.

12. The method as claimed in claim 1, further comprising:
for each tested transition, determining at least one second characteristic time of the tested transition, equal to the time separating the tested transition from a second other transition of the sequence of successive transitions, the second other transition being immediately adjacent to the tested transition in the sequence of successive transitions or separated from the tested transition by a predetermined number of successive transitions of the sequence of successive transitions, the predetermined number comprised between 1 and 2N−2, and being different from the other tested transition.

13. The method as claimed in claim 1, wherein the estimated complete rotation time is equal to an average computed from a plurality of times among the following times: the moving complete rotation time associated with the tested transition, the moving complete rotation time associated with the other transition, and one or more moving complete rotation times associated with one or more transitions separating the tested transition from the other transition.

14. A measuring device for instrumenting an assembly comprising:
   a rotating member configured to rotate with respect to a reference member about an axis of rotation;
   a multipole annular encoder comprising N pairs of poles, the encoder fastened to the rotating member, each pair of the poles comprising a pole of north type and a pole of south type, the N pairs of the poles forming, on one rotation, an alternation of poles of the north type and of poles of the south type, the alternation of poles of the north type and of poles of the south type not being distributed regularly around the axis of rotation; and
   a sensor fixed with respect to the reference member so as to detect a succession of successive transitions each characteristic of a passage of the poles of the alternation of poles in front of the sensor; and
   a measuring circuit configured to detect an absolute angular position or an absolute angular travel of the rotating member with respect to the reference member about the axis of rotation, the measuring circuit configured to:
      detect with the sensor a sequence of successive transitions, each transition characteristic of a passage of the poles of the alternation of poles in front of the sensor,
      for a plurality of the transitions, each of which is referred to as a tested transition, and preferably for all the transitions of the sequence of successive transitions, determine at least one characteristic time of the tested transition, equal to a time separating the tested transition from another transition of the sequence of successive transitions, the other transition being immediately adjacent to the tested transition in the sequence of successive transitions or being separated from the tested transition by a predetermined number of successive transitions of the sequence of successive transitions, the predetermined number comprised between 1 and 2N−2,
      determine a plurality of moving complete rotation times each associated with one of the transitions extracted from the sequence of successive transitions and each equal to a time separating the extracted transition from a preceding transition of order 2N of the sequence of successive transitions, and an estimated complete rotation time, which is dependent on one or more of the moving complete rotation times, and
      compute for each tested transition at least one characteristic angle of the tested transition, which angle is proportional to a ratio between the characteristic time of the tested transition and the estimated complete rotation time.

15. The measuring device as claimed in claim 14, wherein the sensor is configured to detect the north or the south type of the pole of the alternation of poles that is located facing the sensor.

* * * * *